Nov. 30, 1943.  F. S. CHRISMAN  2,335,484

COLLAPSIBLE CARRIAGE

Filed Feb. 24, 1941

FRANK S. CHRISMAN.
INVENTOR.

BY Oltsch & Knoblock
ATTORNEYS.

Patented Nov. 30, 1943

2,335,484

UNITED STATES PATENT OFFICE 2,335,484

COLLAPSIBLE CARRIAGE

Frank S. Chrisman, South Bend, Ind., assignor to South Bend Toy Manufacturing Co., South Bend, Ind., a corporation of Indiana Application February 24, 1941, Serial No. 380,224

1 Claim. (Cl. 280—41)

This invention relates to collapsible carriages, and more particularly to baby carriages or doll carriages.

Heretofore, the construction of collapsible carriages of this character has generally entailed the use of a large number of parts which have rendered the same expensive in construction and difficult to assemble and operate.

The primary object of this invention is to provide a collapsible carriage of this character which is of a simple and inexpensive construction entailing the use of a minimum number of parts, and which is easy to operate for the purpose of collapsing or erecting the same.

A further object is to provide a carriage of this character having a frame of the pivoted cross bar type, wherein one bar has a joint and means cooperating with the parts of the jointed bar for releasably locking the same.

A further object is to provide a carriage having a frame of the pivoted cross bar type, wherein one bar is pivoted to a handle at a point spaced from the body carrying frame member and mounts a pivoted hook for releasably locking said handle in fixed relation thereto.

A further object is to provide a carriage having a frame of the pivoted cross bar type, wherein one bar has a joint with a handle and a lock for the joint so constructed and arranged that the gravitational and other normally applied stresses acting on the handle and the lock are all applied thereto in a direction to maintain the locked relation of the parts.

Figure 1:
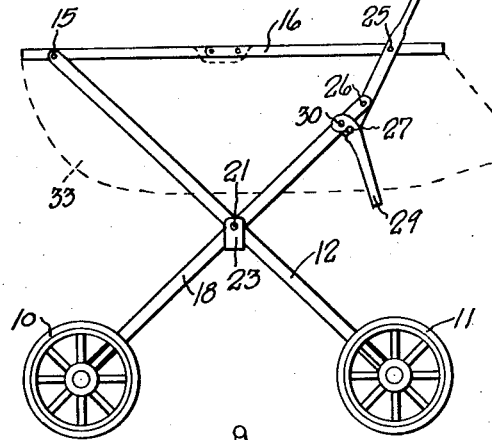
Fig. 1 is a side elevation of the framework of the carriage, with the body of the carriage illustrated in dotted lines.
Figure 2:
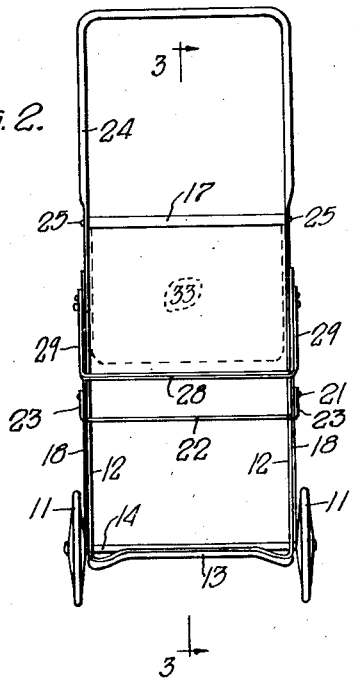
Fig. 2 is a rear elevational view of the carriage.

Referring to the drawing, which illustrates the preferred embodiment of the invention, numeral 10 designates the front wheels and 11 the rear wheels of the carriage. A U-shaped bar 12 has openings at the lower end thereof adjacent the cross piece 13 thereof in which the axle 14 of the rear wheels 11 is journaled. The opposite elongated arms of the U-shaped bar 12 extend in parallel relation in an upwardly forwardly inclined direction. The upper ends of bars 12 are pivoted at 15 to the opposite side members 16 of an endless body carrying member preferably of elongated rectangular form, and including end parts 17. Pivot 15 is preferably adjacent to the front end of member 16.

A second U-shaped bar 18, whose arms are of a shorter length than the arms of bars 12, has openings formed therein adjacent the cross piece 19 for journalling the axle 20 of front wheels 10. Bar 18 extends in a rearwardly upwardly inclined direction from front wheels 10 and is pivotally connected to bars 12 at 21. A transverse bar 22 having upturned ears 23 connected to the bars 12 and 18 by the pivot 21 constitutes a spacer and reinforcing means for the intermediate parts of the cross bars 12 and 18.

An inverted U-shaped handle 24 has its parallel side arms pivoted at 25 to the side bars 16 of the body supporting frame member adjacent the rear end of the opposite members 16. The arms of the handle 24 project downwardly from pivot 25 and are pivotally connected at 26 with the upper ends of the cross bars 18 in spaced relation to the end of said handle 24. The lower ends of handle 24 carry headed abutment pins 27 projecting outwardly therefrom.

A U-shaped locking bar 28 having side arms 29 terminating in configured ends is pivotally connected at 30 to the opposite cross bars 18. The spacing of pivot 30 from pivot 26 is substantially equal to the spacing of abutment pin 27 from pivot 26. The pivoted ends 31 of arms 29 of the locking member are enlarged, and an arcuate slot 32 opening at the forward edge of said end portion 31 and concentric with the pivot 30 is formed in said end 31. The mouth of slot 32 flares by reason of the curve thereat which merges with the bar edge and the large diameter edge of the slot, and thus forms a cam. The spacing of slot 32 from pivot 30 is such as to accommodate and receive the abutment pins 27 when the handle 24 is in operative relation to the cross bars 18.

It will be understood that carriage body 33 is suspended from member 16 and 17, and is formed of a fabric or other suitable flexible material.

It will be obvious that when the carriage frame is erected as illustrated in Fig. 1, the abutment pins 27 will engage the lower edges of the cross bars 18. Thereupon, the locking member 28—29 may be pivoted in a downward forward direction from the position illustrated in Fig. 3 to that illustrated in Fig. 1, whereby the slots 32 will be caused to slide and fit around the abutment pins 27. In this relation of the parts, the pivot connection between the handle 24 and the cross bars 18 is locked and the carriage is held in its erected or operative position. Note that while the carriage is being used, any downward component of force exerted upon the handle incident to pushing of the carriage will urge the abutments 27 forwardly and upwardly against bars 18 to maintain the locking condition of the parts. Likewise, the locking member 28—29 will be held in the locked position by gravity as illustrated in Figs. 1 and 4. Hence all normal stresses applied to the device act in a manner to complement the locking means and no normal stresses oppose said locking means. However, should any forward and upwardly directed force be applied to the handle in the manipulation of the carriage, which force would tend to separate the abutment 27 from the cross bars 18, the same will be resisted by the locking member 28—29. Also, note in this connection the close or short spacing between the pivot 30 and the abutment pin 27, as compared with the length of the arms 29 as required to pass under and in spaced relation below the carriage body 33. This proportioning of the parts insures against any accidental release of the locking member 28—29.

When the carriage is to be collapsed, it is only necessary to pivot the locking member 28 and 29 rearwardly and upwardly to disengage the pin 27 and slot 32, whereupon the weight of the parts will cause the carriage to collapse to its full extent. In the fully collapsed position of the parts, the cross bars 12 and 18, the handle 24, and the locking bar 28—29 all lie in compact relation and assume positions only slightly angularly displaced. The height of the frame when collapsed is less than the radius of the wheels 10 and 11, so as to reduce to a minimum the amount of space required to store the collapsed carriage. For the purpose of erecting the carriage from collapsed condition, it is only necessary to grasp and pull upwardly on the handle 24 until the frame parts assume the positions illustrated in Fig. 1 and then to pivot the locking member 28—29 into operative engagement with the abutment pins 27.

Figure 3:
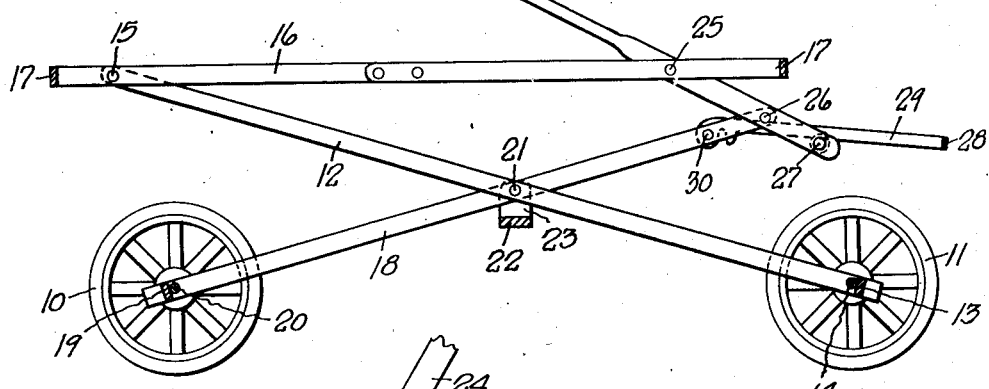
Fig. 3 is an enlarged longitudinal vertical sectional view taken on line 3—3 of Fig. 2 with the body member omitted and the framework partially collapsed.
Figure 4:
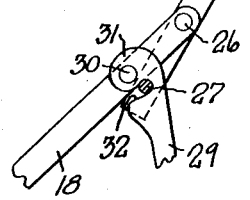
Fig. 4 is an enlarged fragmentary detail sectional view illustrating the locking means for the device.

Attention is directed to the fact that Fig. 3 illustrates a position of the parts, intermediate fully collapsed and fully erected position, and that this figure is not intended to illustrate the fully collapsed position of the parts.

Attention is also directed to the simplicity of the locking feature of carriage, and to the fact that the same constitutes the means for the "breaking" of the frame preparatory to collapse thereof, so that the number of parts required for the device is considerably reduced as compared to previous frame constructions of carriages of this character.

In other words, the cross piece of the U-shaped member 28—29 constitutes the means by which the locking element is operated either by the hand or by the foot, while the ends or heads 31 of the arms 29 extend to both sides of the carriage and form the operating or controlling parts of the pivot lock.

The instant construction has an additional advantage as follows: By regulating the width of the mouth of the slot 32 as desired, it is possible to effect a lock of the parts while the same are somewhat out of fully erect position. In other words, by using a wide flaring mouth of the slot, the pins 27 may be engaged when the parts are not in fully erect position and the subsequent movement of the U-shaped member 28—29 will serve in a cam action working against the pins 27 to bring the pivoted parts to fully erect position.

I claim:

Locking means for a collapsible carriage having an endless body supporting member, a body carried thereby, an inclined U-shaped bar pivoted at its ends to opposite sides of one end of said member, a second oppositely inclined U-shaped bar intersecting and pivoted to said first bar, and an inverted inclined U-shaped handle pivoted to said second bar and to said member, comprising abutments on each end of said handle bearing on the lower edges of the ends of said second bar, and a U-shaped locking bar extending substantially vertically and transversely below said body and pivoted at each end to the sides of said second bar, the ends of said locking bar being transversely slotted at the front thereof adjacent and concentric with said pivots to fit around said abutments, said slots having flaring mouths defined in part by curved edges merging with the front bar edge and the large diameter slot edge to form cams engageable with said abutments to urge the same into operative cross-bar-engaging position upon pivoting of said locking bar to operative locking position.

FRANK S. CHRISMAN.